(12) United States Patent
Chou

(10) Patent No.: US 9,740,217 B2
(45) Date of Patent: Aug. 22, 2017

(54) DEVICE AND METHOD FOR CONTROLLING A FAN OF A DISPLAY

(71) Applicant: Bor-Bin Chou, Hsin-Chu (TW)

(72) Inventor: Bor-Bin Chou, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 530 days.

(21) Appl. No.: 14/457,126

(22) Filed: Aug. 12, 2014

(65) Prior Publication Data
US 2015/0066211 A1 Mar. 5, 2015

(30) Foreign Application Priority Data

Sep. 2, 2013 (TW) .............................. 102131577 A

(51) Int. Cl.
G01M 1/38 (2006.01)
G05D 23/19 (2006.01)
G02F 1/1333 (2006.01)

(52) U.S. Cl.
CPC ... G05D 23/1919 (2013.01); G02F 1/133385 (2013.01)

(58) Field of Classification Search
CPC .................................................. G05D 23/1919
(Continued)

(56) References Cited

U.S. PATENT DOCUMENTS 4,785,213 A * 11/1988 Satake .................... H02K 16/00
310/114
5,099,652 A * 3/1992 Iida .......................... F24F 1/025
62/129

(Continued)

FOREIGN PATENT DOCUMENTS

CN 100430854 11/2008
CN 102422342 4/2012
(Continued)

OTHER PUBLICATIONS

Kong, Fan-Tian, et al. "Distributed temperature control system based on multi-sensor data fusion." Machine Learning and Cybernetics, 2005. Proceedings of 2005 International Conference on. vol. 1. IEEE, 2005.pp. 494-498.*

(Continued)

Primary Examiner — Satish Rampuria
(74) Attorney, Agent, or Firm — Jianq Chyun IP Office

(57) ABSTRACT

A device is suitable for controlling a rotation-speed of a fan of a display. The device includes a temperature sensor for sensing a current temperature of the display, a memory for storing the current temperature of the display and a first and a second setting-temperature and a control module coupled to the temperature sensor and the memory and adapted to couple to the fan of the display. The control module compares the current temperature of the display with the first and the second setting-temperatures and judging the variation of the current temperature of the display to control the rotation-speed of the fan. If the control module judges out the current temperature of the display sensed by the temperature sensor rises, the control module raises the rotation-speed of the fan when the rotation-speed of the fan is lower than a maximum rotation-speed.

14 Claims, 2 Drawing Sheets

(58) Field of Classification Search
USPC .................................................. 700/275–306
See application file for complete search history.

(56) References Cited

U.S. PATENT DOCUMENTS

| | | | |
|---|---|---|---|
| 5,182,915 A * | 2/1993 | Iida | F24F 1/025 62/180 |
| 5,920,264 A * | 7/1999 | Kim | G06F 1/206 257/E23.08 |
| 6,447,146 B1 * | 9/2002 | Skinner | F21V 29/02 362/218 |
| 6,481,387 B1 * | 11/2002 | Sano | B60H 1/00735 123/41.1 |
| 2005/0248517 A1 * | 11/2005 | Luther Weindorf | G09G 3/3208 345/82 |
| 2012/0206426 A1 * | 8/2012 | Sakakima | G09G 3/3426 345/207 |

FOREIGN PATENT DOCUMENTS

| | | |
|---|---|---|
| TW | I270846 | 1/2007 |
| TW | I294550 | 3/2008 |
| TW | I395875 | 5/2013 |

OTHER PUBLICATIONS

Endo, Hiroshi, et al. "Cooperative control architecture of fan-less servers and fresh-air cooling in container servers for low power operation." Proceedings of the Workshop on Power-Aware Computing and Systems. ACM, 2013.pp. 1-5.*

Hughes, Ben Richard, Hassam Nasarullah Chaudhry, and Saud Abdul Ghani. "A review of sustainable cooling technologies in buildings." Renewable and Sustainable Energy Reviews 15.6 (2011): pp. 3112-3120.*

* cited by examiner

DEVICE AND METHOD FOR CONTROLLING A FAN OF A DISPLAY

CROSS-REFERENCE TO RELATED APPLICATION

This application claims the priority benefit of Taiwan application serial no. 102131577, filed on Sep. 2, 2013. The entirety of the above-mentioned patent application is hereby incorporated by reference herein and made a part of this specification.

BACKGROUND OF THE INVENTION

Field of the Invention

The invention generally relates to a display with a fan, and more particularly, to a device and a method for controlling a fan of a display.

Description of Related Art

A display, such as a liquid crystal display (LCD), is a common electronic product, which has been widely used in various fields, serving as a computer monitor, a television set and a public notice board. In order to avoid overheating of the display to affect the normal operation thereof, the display can have a built-in fan to produce a forced convection air current so as to lower the temperature of the display. In order to control the on/off of the fan, the display can have a built-in temperature sensor to monitor the temperature of the display. When the temperature detected by the temperature sensor is higher than a preset temperature, the fan will be automatically turned on. Conversely, when the detected temperature is lower than the preset temperature, the fan will be automatically turn off.

However, as the display applications get more widely, on a single display, different luminance and different applied ambient temperatures are likely to occur, wherein the luminance may range from 150 nits to 800 nits, and the applied ambient temperature may be lower than 0° C. or higher than 50° C. Therefore, it is not easy to achieve the dynamic temperature management for a display.

Taiwan Patent No. TW I294550 discloses a cooling system of a projector; Taiwan Patent No. TW I395875 discloses a control system and a control method for dynamically adjusting a rotation-speed of a fan; China Patent No. CN100430854 discloses an LCD with a cooling device and an inner-temperature adjusting method thereof; Taiwan patent No. TW I270846 discloses a device and a method for adjusting the video luminance.

SUMMARY OF THE INVENTION

Accordingly, the invention is directed to a device for controlling a rotation-speed of a fan of a display.

The invention is also directed to a method for controlling a rotation-speed of a fan of a display.

In order to make the features and advantages of the invention more comprehensible, the invention is further described in detail in the following with reference to the embodiments and the accompanying drawings.

To achieve one of, a part of or all of the above-mentioned advantages, or to achieve other advantages, the invention provides a device suitable for controlling a rotation-speed of a fan of a display. The device includes a temperature sensor, a memory and a control module. The temperature sensor is for sensing a current temperature of the display. The memory is for storing the current temperature of the display, a first setting-temperature and a second setting-temperature. The control module is coupled to the temperature sensor and the memory and adapted to be coupled to the fan of the display for comparing the current temperature of the display with the first setting-temperature, comparing the current temperature of the display with the second setting-temperature, and judging the variation of the current temperature of the display to control the rotation-speed of the fan, wherein if the control module judges out the current temperature of the display sensed by the temperature sensor rises, the control module raises the rotation-speed of the fan when the rotation-speed of the fan is lower than a maximum rotation-speed.

An embodiment of the invention provides a method suitable for controlling a rotation-speed of a fan of a display. The method includes following steps: (a) detecting a temperature of the display to obtain a current temperature and going to step (b); (b) judging whether or not the current temperature is higher than a first setting-temperature, and if the current temperature is higher than the first setting-temperature, turning on the fan and keeping the rotation-speed of the fan and going to step (c), and if the current temperature is lower than or equal to the first setting-temperature, going to step (a); (c) detecting the temperature of the display to judge whether or not the current temperature rises so as to update the current temperature, and if the current temperature rises, adjusting the rotation-speed of the fan and continuing to step (c), and if the current temperature does not rise, going to step (d); (d) judging whether or not the current temperature falls down, if the current temperature does not fall down, going to step (c), and if the current temperature falls down, going to step (e); and (e) judging whether or not the current temperature is lower than or equal to a second setting-temperature, if the current temperature is lower than or equal to the second setting-temperature, turning off the fan and going to step (a), and if the current temperature is higher than the second setting-temperature, going to step (c).

Based on the depiction above, the above-mentioned embodiment of the invention could achieve at least one of the following advantages or effects. In the embodiment of the invention, by comparing the current temperature of the display with the first setting-temperature, comparing the current temperature of the display with the second setting-temperature, and judging the variation of the current temperature of the display, the rotation-speed of the fan gets controlled so as to realize the dynamic temperature management.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
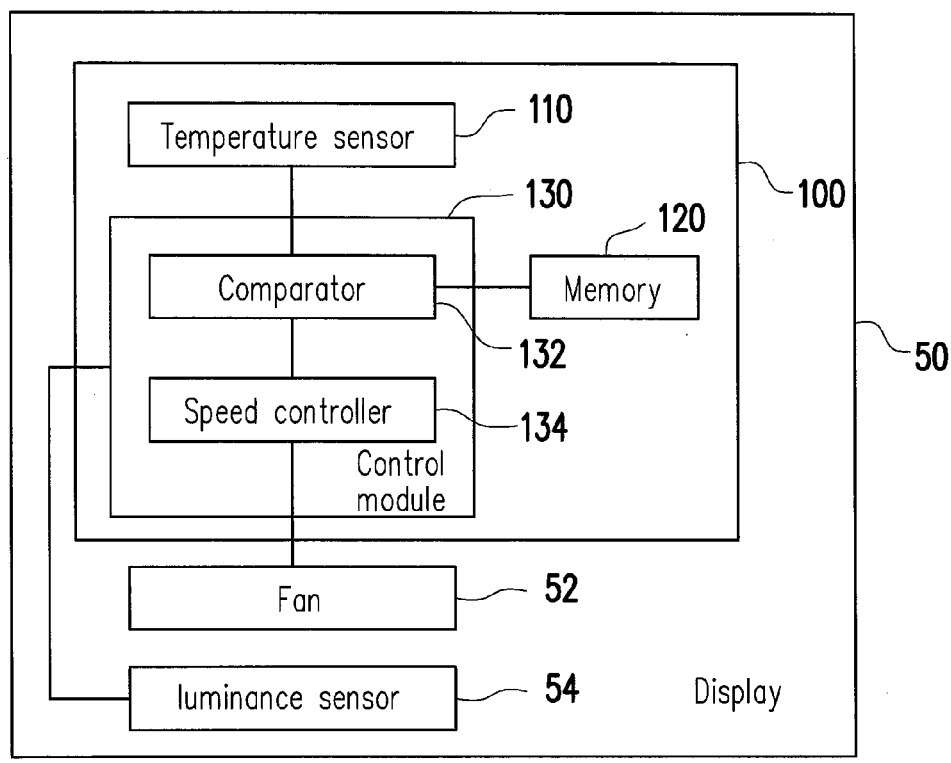
FIG. 1 is a schematic block diagram showing a device for controlling a rotation-speed of a fan of a display according to an embodiment of the invention.

FIG. 1 is a schematic block diagram showing a device for controlling a rotation-speed of a fan of a display according to an embodiment of the invention. Referring to FIG. 1, a device 100 of the embodiment is provided for controlling a rotation-speed of a fan 52 of a display 50 so as to ensure the temperature of the display 50 kept in an operating temperature range. The device 100 includes a temperature sensor 110, a memory 120 and a control module 130. The temperature sensor 110 is used to sense a current temperature T of the display 50, for example, the current temperature T of a heat-sensitive component closest to an upper-limit of the operating temperature range thereof in the display 50. The memory 120 is provided for storing the current temperature T of the display 50, a first setting-temperature T1 and a second setting-temperature T2. The control module 130 is coupled to the temperature sensor 110 and the memory 120 and adapted to be coupled to the fan 52 of the display 50.

Figure 2:
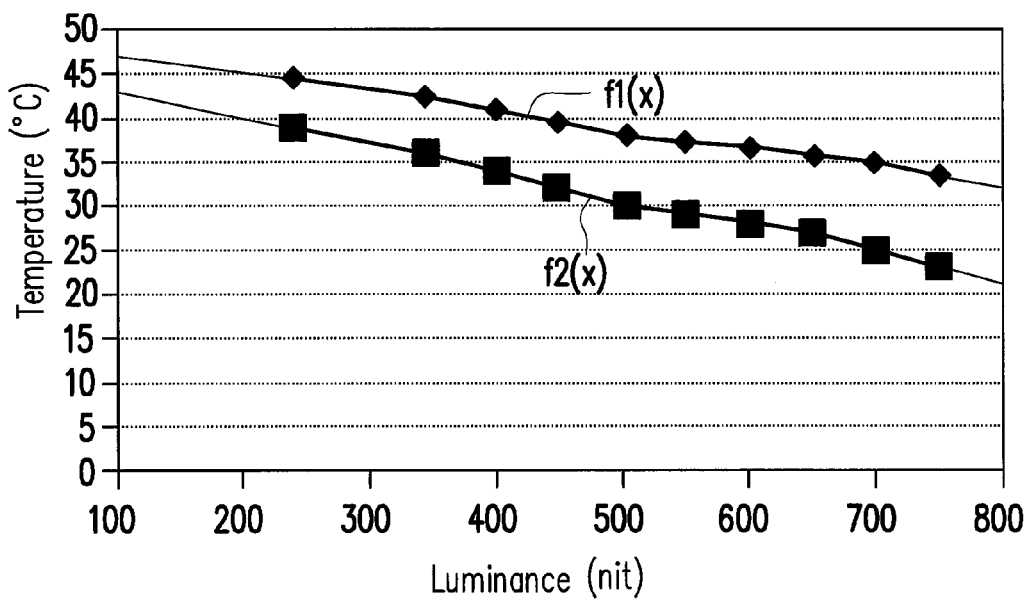
FIG. 2 is a graph diagram of two functions of first/second temperature vs. luminance corresponding to the embodiment of FIG. 1.

FIG. 2 is a graph diagram of two functions of first/second temperature vs. luminance corresponding to the embodiment of FIG. 1. Referring to FIGS. 1 and 2, in the embodiment, in order to calculate out the first setting-temperature T1 and the second setting-temperature T2, a function $f1(x)$ of first temperature vs. luminance and a function $f2(x)$ of second temperature vs. luminance are obtained in advance. In more details, under a specific luminance and turning off the fan 52, a heat-sensitive component closest to the upper-limit of the operating temperature range thereof in the display 50 is discovered. Then, it is obtained the difference between the temperature of the heat-sensitive component detected during running and under a specific luminance and the upper-limit of the operating temperature range, followed by adding the difference to the temperature detected by the temperature sensor 110 so as to obtain a temperature corresponding to the specific luminance. Further, other temperatures of the heat-sensitive component corresponding to other different luminance are obtained. And based on many pairs of the temperatures and the luminance, a function of first temperature vs. luminance $f1(x)=-ax+b$ is obtained by fitting in asymptotic method, wherein x represents current luminance, while a and b are constants. The current luminance x could be a preset luminance specified by the display 50 or could be obtained by detecting the display 50 with a luminance sensor 54. The luminance sensor 54 may be disposed in the display 50. Thus, after the control module 130 substitutes the current luminance x in the function of first temperature vs. luminance $f1(x)=-ax+b$ with the current luminance x, the first setting-temperature T1 corresponding to the current luminance x could be calculated out. The function $f1(x)$ of first temperature vs. luminance is used to control the fan 52 for rotation or not. When the current temperature of the heat-sensitive component detected by the temperature sensor 110 is higher than the first setting-temperature T1 obtained by substituting the current luminance x in the function $f1(x)$ of first temperature vs. luminance with the current luminance x, the fan 52 is turned on to cool down the display 50.

After the fan 52 starts to rotate, the temperature of the heat-sensitive component detected by the temperature sensor 110 may slow down its raising rate, may not rise anymore or may start falling down, so that when the above-mentioned testing result reaches an equilibrium temperature, the temperature variation is recorded. A function $f2(x)$ of second temperature vs. luminance could be established by using the temperature difference between the equilibrium temperature and the temperature obtained from the function $f1(x)$ of first temperature vs. luminance, wherein the function of second temperature vs. luminance is $f2(x)=-cx+d$, and x represents current luminance, while c and d are constants. After the control module 130 substitutes the current luminance x in the function of second temperature vs. luminance $f2(x)=-cx+d$ with the current luminance x in the function $f1(x)$ of first temperature vs. luminance, the second setting-temperature T2 corresponding to the current luminance x could be calculated out. The function $f2(x)$ of second temperature vs. luminance is used to control the fan 52 for turning off or not. When the ambient temperature is lower than a certain temperature, and the current temperature of the heat-sensitive component detected by the temperature sensor 110 is lower than the second setting-temperature T2 obtained by substituting the detected current luminance x for the current luminance x in the function $f2(x)$ of second temperature vs. luminance, the difference between the temperature of the heat-sensitive component and the upper-limit of the operating temperature range of the display 50 is larger, so that there is no need to cool down the display 50 with the fan 52 and the fan 52 would be turned off.

The memory 120 could be used to store the current temperature x, the function $f1(x)$ of first temperature vs. luminance and the function $f2(x)$ of second temperature vs. luminance, while the control module 130 could read the content stored in the memory 120 for operation. Therefore, after the control module 130 substitutes the current luminance x in the function of first temperature vs. luminance $f1(x)=-ax+b$ with the current luminance x, the first setting-temperature T1 corresponding to the current luminance x could be calculated out. The control module 130 could also substitute the current luminance x in the function of second temperature vs. luminance $f2(x)=-cx+d$ with the same current luminance x, followed by calculating out the second setting-temperature T2 corresponding to the current luminance x. Under the same current luminance x, the first setting-temperature T1 is higher than the second setting-temperature T2. In the embodiment, the function f1(x) of first temperature vs. luminance and the function f2(x) of second temperature vs. luminance are linear functions. In another embodiment of the invention, the control module 130 could further store the calculated first setting-temperature T1 and second setting-temperature T2 in the memory 120. If the current luminance x is unchanged, the control module 130 could directly read the same first setting-temperature T1 and second setting-temperature T2. Only when the current luminance x is changed, the current luminance x in the function f1(x) of first temperature vs. luminance and the function f2(x) of second temperature vs. luminance are substituted with the current luminance x again to calculate out the updated first setting-temperature T1 and second setting-temperature T2 so as to advance the operation efficiency of the control module 130, which the invention is not limited to.

Referring to FIG. 1 again, the control module 130 is coupled to the temperature sensor 110 and the memory 120 for comparing the current temperature T of the display 50 with the first setting-temperature T1, comparing the current temperature T of the display 50 with the second setting-temperature T2, and judging the variation of the current temperature T of the display 50. The control module 130 is adapted to be coupled to the fan 52 of the display 50 for controlling the rotation-speed of the fan 52. For example, the control module 130 controls the rotation-speed of the fan 52 by controlling the voltage of the fan 52. If the control module 130 judges out the current temperature T of the display 50 sensed by the temperature sensor 110 rises, the control module 130 raises the rotation-speed of the fan 52 when the rotation-speed of the fan 52 is lower than a maximum rotation-speed. If the control module 130 judges out the current temperature T of the display 50 is higher than the first setting-temperature T1, the control module 130 turns on the fan 52 and keeps the rotation-speed of the fan 52. If the control module 130 judges out the current temperature T of the display 50 is lower than or equal to the second setting-temperature T2, the control module 130 turns off the fan 52.

Continuing to FIG. 1, in the embodiment, the control module 130 includes a comparator 132 and a speed controller 134. The comparator 132 is coupled to the temperature sensor 110 and the memory 120 for comparing the current temperature T of the display 50 with the first setting-temperature T1, comparing the current temperature T of the display 50 with the second setting-temperature T2 and judging the variation of the current temperature T of the display 50. The speed controller 134 is coupled to the comparator 132 and adapted to be coupled to the fan 52 of the display 50 for controlling the rotation-speed of the fan 52, for example, the speed controller 134 controls the rotation-speed of the fan 52 by controlling the voltage of the fan 52. If the control module 130 judges out the current temperature T of the display 50 sensed by the temperature sensor 110 rises, the speed controller 134 of the control module 130 raises the rotation-speed of the fan 52 when the rotation-speed of the fan 52 is lower than a maximum rotation-speed. If the comparator 132 of the control module 130 judges out the current temperature T of the display 50 is higher than the first setting-temperature T1, the speed controller 134 of the control module 130 turns on the fan 52 and keeps the rotation-speed of the fan 52. If the comparator 132 of the control module 130 judges out the current temperature T of the display 50 is lower than or equal to the second setting-temperature T2, the speed controller 134 of the control module 130 turns off the fan 52.

Figure 3:
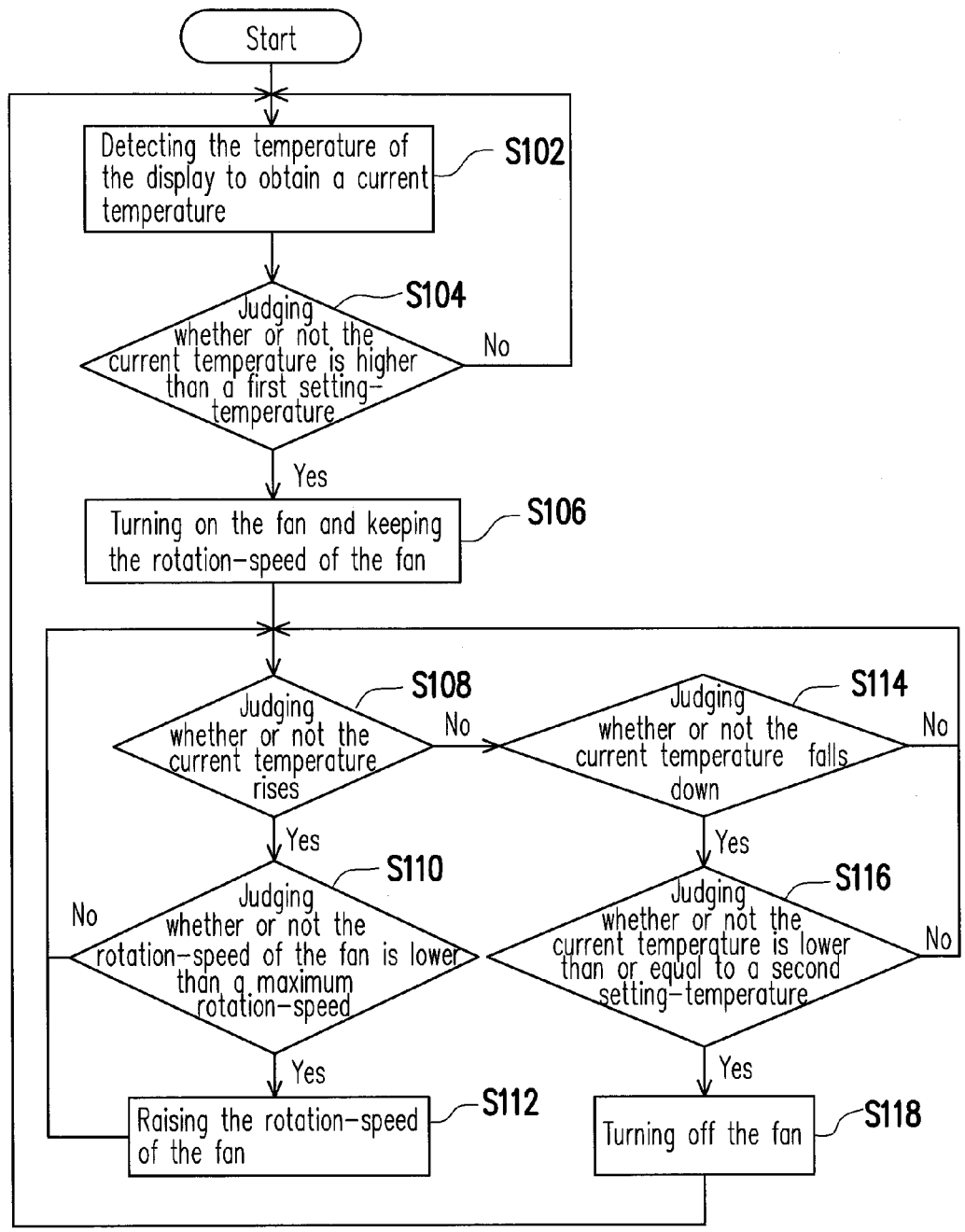
FIG. 3 is a flow chart of a method for controlling a rotation-speed of a fan of a display according to an embodiment of the invention.

FIG. 3 is a flow chart of a method for controlling a rotation-speed of a fan of a display according to an embodiment of the invention. In accordance with the device of FIG. 1, the method of FIG. 3 is described as follows. Referring to FIGS. 1 and 3, the method in the embodiment is provided for controlling the rotation-speed of the fan 52 of the display 50. In the embodiment, the method includes following steps. In step S102, the temperature sensor 110 is used for detecting the temperature of the display 50 to obtain a current temperature T and the procedure goes to step S104. In step S104, the control module 130 judges whether or not the current temperature T is higher than a first setting-temperature T1, and if the current temperature T is higher than the first setting-temperature T1, the control module 130 turns on the fan 52 and keeps the rotation-speed of the fan 52 as shown by step S106 and the procedure goes to step S108; if the current temperature T is lower than or equal to the first setting-temperature T1, the procedure goes to step S102. Similarly to the device of FIG. 1, the control module 130 substitutes the current luminance x in the function of first temperature vs. luminance f1(x)=−ax+b with the detected current luminance x, the first setting-temperature T1 corresponding to the current luminance x could be calculated out. In addition, the above-mentioned current luminance x could be a preset luminance determined by the display 50 or obtained from sensing the display 50 by a luminance sensor 54, and the luminance sensor 54 is coupled to the control module 130.

In step S108, the temperature sensor 110 detects the temperature of the display 50, and the control module 130 judges whether or not the current temperature T rises so as to update the current temperature T. If the current temperature T rises, the procedure goes to step S110; if the current temperature T does not rise, the procedure goes to step S114. In step S110, it is judged whether or not the rotation-speed of the fan 52 is lower than a maximum rotation-speed. If the rotation-speed of the fan 52 is lower than the maximum rotation-speed of the fan 52, the rotation-speed of the fan 52 is raised, as shown by step S112, and the procedure goes to step S108; if the rotation-speed of the fan 52 is equal to the maximum rotation-speed of the fan 52, the procedure goes to step S108. In another unshown embodiment, step S110 could be omitted so that when the current temperature T rises, step S110 is skipped and the procedure goes to step S112. In step S114, the control module 130 is used to judge whether or not the current temperature T falls down. If the current temperature T does not fall down, the procedure goes to step S108; if the current temperature T falls down, the procedure goes to step S116.

In step S116, the control module 130 judges whether or not the current temperature T is lower than or equal to a second setting-temperature T2. If the current temperature T is lower than or equal to the second setting-temperature T2, the fan 52 is turned off, as shown by step S118, and the procedure goes to step S102; if the current temperature T is higher than the second setting-temperature T2, the procedure goes to step S108. Similarly to the device of FIG. 1, the control module 130 substitutes the current luminance x in the function of second temperature vs. luminance f2(x)=−cx+d with the same current luminance x, and then, the second setting-temperature T2 corresponding to the current luminance x could be calculated out. Under the same current luminance x, the first setting-temperature T1 is higher than the second setting-temperature T2.

In summary, in the above-mentioned embodiment of the invention, the rotation-speed of the fan is controlled by comparing the current temperature of the display with the first setting-temperature, comparing the current temperature of the display with the second setting-temperature and judging the variation of the current temperature of the display, which could realize the dynamic temperature management. In addition, the first setting-temperature T1 and the second setting-temperature T2 are determined by using the current luminance of the display and the functions of first/second temperature vs. luminance, which makes the dynamic temperature management take the current luminance of the display in account, such that a display with a larger luminance range and a larger ambient temperature range has also a good dynamic temperature management.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A device for controlling a fan of a display, suitable to control a rotation-speed of the fan and the device comprising:
   a temperature sensor, sensing a current temperature of the display;
   a memory, storing the current temperature of the display, a first setting-temperature and a second setting-temperature, wherein the first setting-temperature is used to control the fan for rotation or not, and the second setting-temperature is used to control the fan for turning off or not;
   a control module, coupled to the temperature sensor and the memory, and coupled to the fan of the display for comparing the current temperature of the display with the first setting-temperature, comparing the current temperature of the display with the second setting-temperature, and judging a variation of the current temperature of the display to control the rotation-speed of the fan, wherein if the control module judges out the current temperature of the display sensed by the temperature sensor rises, the control module raises the rotation-speed of the fan when the rotation-speed of the fan is lower than a maximum rotation-speed; and
   wherein if the control module judges out the current temperature of the display is lower than or equal to the second setting-temperature, the control module turns off the fan.

2. The device as claimed in claim 1, wherein if the control module judges out the current temperature of the display is higher than the first setting-temperature, the control module turns on the fan and keeps the rotation-speed of the fan.

3. The device as claimed in claim 1, wherein the first setting-temperature is a temperature obtained by calculating a function of first temperature vs. luminance, wherein the luminance is substituted with a current luminance of the display, the second setting-temperature is a temperature obtained by calculating a function of second temperature vs. luminance, wherein the luminance is substituted with the current luminance of the display, and the first setting-temperature is higher than the second setting-temperature.

4. The device as claimed in claim 3, wherein the function of first temperature vs. luminance and the function of second temperature vs. luminance are respectively linear functions.

5. The device as claimed in claim 3, wherein the memory is further used to store the function of first temperature vs. luminance and the function of second temperature vs. luminance.

6. The device as claimed in claim 3, wherein the current luminance is a preset luminance specified by the display.

7. The device as claimed in claim 3, wherein the current luminance is obtained from sensing the display by a luminance sensor.

8. The device as claimed in claim 1, wherein the control module comprises:
   a comparator, coupled to the temperature sensor and the memory for comparing the current temperature of the display with the first setting-temperature, comparing the current temperature of the display with the second setting-temperature, and judging the variation of the current temperature of the display; and
   a speed controller, coupled to the comparator and adapted to be coupled to the fan of the display for controlling the rotation-speed of the fan.

9. A method for controlling a fan of a display, suitable to control a rotation-speed of the fan and the method comprising following steps:
   (a) detecting a temperature of the display to obtain a current temperature and going to step (b);
   (b) judging whether or not the current temperature is higher than a first setting-temperature which is used to control the fan for rotation or not, and if the current temperature is higher than the first setting-temperature, turning on the fan and keeping the rotation-speed of the fan and going to step (c), and if the current temperature is lower than or equal to the first setting-temperature, going to step (a);
   (c) detecting the temperature of the display to judge whether or not the current temperature rises so as to update the current temperature, and if the current temperature rises, adjusting the rotation-speed of the fan and continuing to step (c), and if the current temperature does not rise, going to step (d);

(d) judging whether or not the current temperature falls down, if the current temperature does not fall down, going to step (c), and if the current temperature falls down, going to step (e); and (e) judging whether or not the current temperature is lower than or equal to a second setting-temperature which is used to control the fan for turning off or not, if the current temperature is lower than or equal to the second setting-temperature, turning off the fan and going to step (a), and if the current temperature is higher than the second setting-temperature, going to step (c).

10. The method as claimed in claim 9, wherein in step (c), the step of adjusting the rotation-speed of the fan further comprises a following step:

(c1) judging whether or not the rotation-speed of the fan is lower than a maximum rotation-speed of the fan, and if the rotation-speed of the fan is lower than the maximum rotation-speed of the fan, raising the rotation-speed of the fan and going to step (c), and if the rotation-speed of the fan is equal to the maximum rotation-speed of the fan, going to step (c).

11. The method as claimed in claim 9, wherein the first setting-temperature is a temperature obtained by calculating a function of first temperature vs. luminance, wherein the luminance is substituted with a current luminance of the display, the second setting-temperature is a temperature obtained by calculating a function of second temperature vs. luminance, wherein the luminance is substituted with the current luminance of the display, and the first setting-temperature is higher than the second setting-temperature.

12. The method as claimed in claim 11, wherein the function of first temperature vs. luminance and the function of second temperature vs. luminance are respectively linear functions.

13. The method as claimed in claim 11, wherein the current luminance is a preset luminance specified by the display.

14. The method as claimed in claim 11, wherein the current luminance is obtained from sensing the display by a luminance sensor.

\* \* \* \* \*